Dec. 16, 1958   R. P. LAPPALA   2,864,492
BODY OF POLYMERIZABLE MATERIAL CONTAINING CATALYST AND CARRIER
Filed Dec. 23, 1953
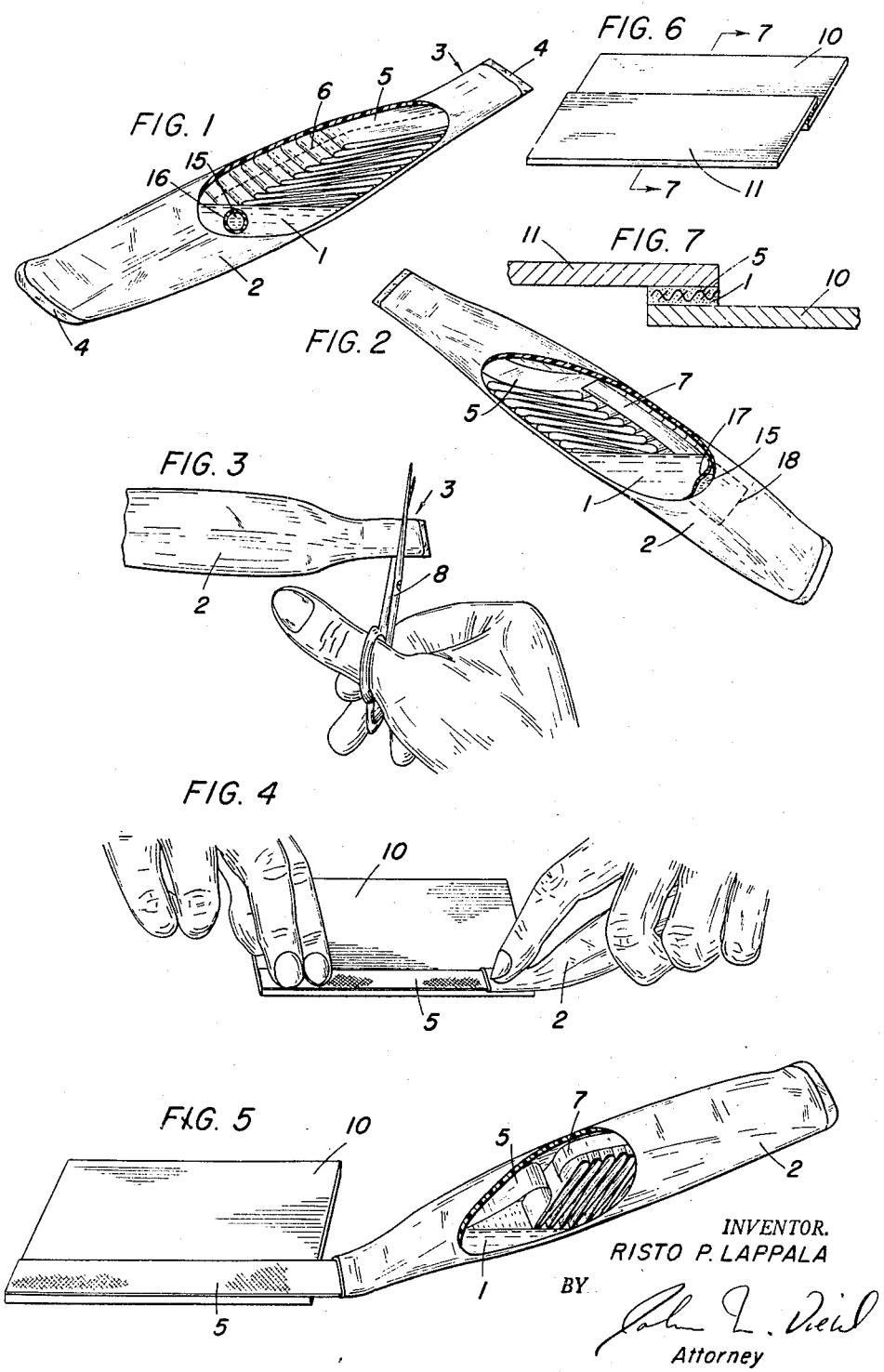
INVENTOR.
RISTO P. LAPPALA
BY
Attorney United States Patent Office
2,864,492
Patented Dec. 16, 1958

2,864,492
BODY OF POLYMERIZABLE MATERIAL CONTAINING CATALYST AND CARRIER

Risto P. Lappala, Madison, Wis., assignor to Bjorksten Research Laboratories, Inc., Madison, Wis., a corporation of Illinois Application December 23, 1953, Serial No. 400,001

6 Claims. (Cl. 206—47)

This invention relates to a body of polymerizable monomeric or pre-polymeric material containing a polymerizing catalyst and a carrier strip for the catalyzed adhesive, and more particularly to such a catalyst- and carrier-containing body provided with means allowing the mixing of catalysts and polymerizable material when desired and means for applying the resultant catalyzed polymerizable material to a surface.

Heretofore some polymerizable substances have been polymerized in the presence of a catalyst such as, for example, benzoyl peroxide, triethylene tetramine, hexamethylene tetramine, and the like. When such a catalyst is introduced into such a polymerizable material, the polymerization reaction starts to take place and cannot be inhibited or delayed so that in order to make possible the use of such resin commercially it has been necessary to provide the ultimate consumer with the polymerizable material and the catalyst or activator in separate packages. The ultimate consumer may then mix the activator with the polymerizable material shortly prior to the time at which he desires to use the mixture and may then apply the mixture in such manner as he may desire, for example, as an adhesive to hold two structural members together or as an adhesive to hold two sheets together in a laminate.

Since an ultimate consumer may be utilizing several adhesives, the requirement that he keep the catalysts separate from the polymerizable material until immediately prior to use imposes a considerable burden upon him. For example, a manufacturer who carries in stock for his own use a substantial quantity of as many as five or ten different adhesives may have to also carry in stock a different activator or catalyst for each. The possibility that an employee will sooner or later use the wrong activator with one of the polymerizable materials is, of course so great that it might better be said to be a physical certainty. Thus the need for maintaining separate stocks of polymerizable material and activator tends to lead to confusion and waste. It may also require a considerable amount of capital investment, at least in floor and shelf space for storage, which could be avoided if separate storage were not necessary.

One of the drawbacks to the use of adhesive for joining metal plates together is that due to the often high viscosity, the tackiness and the quick-setting qualities of many adhesives, it is extremely difficult for untrained operators to provide the correct amount of adhesive at the area to be joined. Often, excessive adhesive is applied to the areas to be joined with the result that a great deal of adhesive is provided with the result that the joint has a weakness below designed strength.

This invention obviates the difficulties of applying an adhesive by providing in the interior of a body of catalyzable, polymerizable material, a carrier strip adapted to be saturated with adhesive and applied to a surface.

It is therefore an object of this invention to overcome the disadvantages of introducing a catalyst into polymerizable material by providing a catalyst or activator packaged together with a polymerizable material to be activated thereby, but maintained out of contact therewith and simultaneously to obviate disadvantages in using adhesive for joining metal sheets by providing a porous adhesive carrier strip within a body of polymerizable material.

Another object is means for conveniently, efficiently and rapidly supplying the correct amount of adhesive to a joint between members to be joined by providing within a body of polymerizable material a porous carrier strip therefor.

Further objects will be apparent from the drawings and following detailed description in which it is my intention to illustrate the invention without thereby limiting its scope to less than that of all equivalents which will be apparent to those skilled in the art and in which like reference numerals refer to like parts and in which:

Figure 1 is a partially cut-away perspective view of a preferred embodiment of the device of the invention;

Figure 2 is a partially cut-away perspective view of another embodiment;

Figure 3 is a perspective view illustrating the first step in the use of the device of the invention;

Figure 4 is a perspective view illustrating the second step in the use of the device of the invention;

Figure 5 is a partially cut-away perspective view further illustrating said second step;

Figure 6 is a perspective view of two plates joined according to the invention;

Figure 7 is a cross-sectional view of the joint of Figure 6 taken on lines 7—7.

This case is a continuation-in-part application of my application entitled "Body of Polymerizable Material Containing Catalyst Therefor," Serial No. 322,239, filed November 24, 1952, now abandoned.

Referring now to Figure 1, adhesive 1 is contained in bag 2. Bag 2 is preferably provided with one end 3 somewhat narrower than the rest of the bag. I may use as an adhesive 1 any of the compositions disclosed as suitable in co-pending application Serial No. 327,161, filed December 20, 1952, now abandoned, in co-pending application Serial No. 326,787, filed December 18, 1952, now abandoned and in co-pending application Serial No. 378,425, filed September 3, 1953, entitled "Room Temperature Setting Adhesive." I may also use as an adhesive any one of several compositions well known to the art such as a single epoxy resin such as Epon–RN34 or Epon–562 sold by Shell Chemical Company, Chicago, Illinois, catalyzable with tri-ethylene tetramine; I may use "Pliobond" sold commercially by Goodyear Tire and Rubber Company. Other adhesives which may suitably be used include: Penacolite (resorcinol adhesive) (Koppers Company, Inc.), phenol formaldehyde adhesives, isocyanate adhesives, furane adhesives.

In those instances wherein adhesive 1 is a catalyzable, polymerizable material, it may be catalyzed with catalyst 15 contained in capsule 16, by pinching the capsule through the wall of bag 2 to rupture the walls of capsule 16 and then kneading the bag to mix catalyst 15 with polymerizable material 1, in the manner described in co-pending application Serial 322,239, filed November 24, 1952 of which this application is a continuation-in-part application.

For those adhesives such as "Pliobond" which do not require a catalyst, the catalyst 15 and capsule 16 may be omitted.

As shown in Figure 2, catalyst 15 may be contained in pocket 17 if adhesive 1 contained in bag 2 as shown in Figure 2 is a catalyzable, polymerizable material. Catalyst 15 may be mixed therewith by first pinching bag 2 to rupture pocket 17, which at its edges 18 is sealed by heat or adhesive or other suitable means to the interior wall of bag 2, and then by kneading the bag. If adhesive 1 is a material which needs no catalysts to accomplish its adhesive action pocket 17 and catalyst 15 may be omitted.

It will be apparent that the device of my invention may be used suitably for adhering together materials other than metal plates, for example, I may adhere metal to glass, glass to glass, metal to metal, wood to glass, wood to metal, wood to wood, paper to wood, paper to metal, paper to glass, paper to paper, polyester to polyester, polyester to metal, polyester to glass, polyester to wood, polyester to paper, polymethacrylate to polyester, polymethacrylate to polymethacrylate, polymethacrylate to metal, polymethacrylate to glass, etc. The materials which are adhered together are not a limiting feature of the invention.

As material for bag 2, I may utilize any suitable flexible material impervious to liquids and impervious to the particular adhesive used. Generally, synthetic resin film bags are particularly suitable. For example, I may use polyethylene, hydrochlorinated rubber (sold as "Pliofilm"), polyvinyl alcohol, cellophane, cellulose acetate, copolymer of vinyl chloride and vinylidene chloride, plasticized polyvinyl acetate or polyvinyl chloride or mixtures or copolymers of plasticized or unplasticized polyvinyl acetate and polyvinyl chloride, polyesters such as polyethylene terephthalate, polytrifluorochloroethylene, polytetrafluoroethylene, and the like.

The bag 2 may have its ends heat-sealed or welded or otherwise closed at 4.

Within bag 2, immersed in liquid adhesive 1, is contained fabric tape 5 folded in pleated fashion. Fabric tape 5 is of course impregnated with the adhesive. The lateral accordion pleated folds of the fabric tape 5 may be maintained by stitching 6 as shown in Figure 1 or by pressure-sensitive tape 7 as shown in Figure 2.

Tape 5 preferably extends to end 3 in such manner that when end 3 is cut off with a scissors 8, as shown in Figure 3, the end of tape 5 will be cut off also and the freshly cut end of tape 5 may be grasped with the fingernails by reaching between the freshly cut portion 3 of bag 2.

As shown in Figure 4, tape 5 impregnated with adhesive 1 is then withdrawn from the freshly cut end of bag 2 and is laid on that portion of member 10 to which it is desired to adhere another member.

As shown in Figure 5 when tape 5 is withdrawn in this manner, it is pulled loose from pressure-sensitive tape 7. If an embodiment is utilized wherein the lateral folds of tape 5 are maintained by means of stitching 6, withdrawal of tape 5 is accomplished by tearing loose and breaking the threads in stitching 6 or by utilizing thread soluble in the adhesive composition. In order to complete the joining of two members a second member 11 may be laid on top of tape 5 as shown in Figure 6 and thus the joint shown in Figure 7 may be provided wherein tape 5 is imbedded in adhesive 1 which secures together members 10 and 11.

It is not necessary that the pressure-sensitive tape 7 retain its adhesivity for tape 5 at such time as both are contained in sealed bag 2 and immersed in adhesive 1. The primary utility of pressure-sensitive tape 7 is realized at the time the device is assembled and folded tape 5 is inserted into one end of bag 2 and that end is then closed by heat-sealing or other suitable means. The device has been found quite usable under circumstances wherein adhesive 1 attacks the pressure-sensitive adhesive on the surface of pressure-sensitive tape 7 in such manner as to cause it to lose all adhesive characteristics. It is quite difficult to stuff a tape into a bag full of viscous, tacky, gooey adhesive in such manner that it will occupy a minimum space. This is accomplished by providing the tape in laterally accordion-pleat-folded manner and this operation is easily accomplished however when these lateral folds are maintained prior to assembly of the device by pressure-sensitive tape extending around tape 5 or when the folds are maintained by stitching extending entirely through the folds of tape 5. It is immaterial generally whether stitching 6 or tape 7 continues to act as a force for maintaining said accordion pleat folds after the device is completely assembled.

If the adhesive is of the room temperature setting type, the necessary amount of pressure is applied to the joint and it is allowed to remain undisturbed until the adhesive has polymerized or otherwise cured to form a strong bond.

If the adhesive is of a type which is set only by curing at elevated temperatures, the joint is usually clamped or pressure is otherwise imposed on the joint and it is subjected to the required heating for such a period as may be necessary. After removal it is then ready for use.

With any sort of adhesive, a joint of the type shown in Figure 7 may be formed. Types of joints such as butt joints, scarf joints, sleeve joints and the like may of course be formed by suitable positioning of the members to be joined.

It will thus be apparent that the invention relates to a flexible bag containing adhesive, said bag being impermeable and chemically stable with respect to said adhesive and also containing a fabric tape folded in an accordion-pleated manner wherein lateral accordion-pleated folds are maintained by stitching or pressure-sensitive tape. The device may be used by snipping off one end and withdrawing the adjacent end of the tape from said bag, laying said tape on the area of one member which is to be joined to another member and thence proceeding to complete the joining of the members in the same manner as if the tape were not present and the adhesive had been placed in location by other means.

The tape may be made of any suitable material such as for example, glass fabric, cotton fabric, rayon fabric, nylon fabric or any other woven or non-woven fabric which is porous and which may be impregnated with a liquid, preferably viscous, adhesive.

It has been found that the use of glass tape for joints made in this manner between aluminum plates increases the strength of the joint when adhesives of the types first mentioned above are utilized.

It is thus apparent that the invention is broad in scope and is to be interpreted as including all those equivalents which will be apparent to those skilled in the art and is not to be limited excepting by the claims.

Having thus disclosed my invention, I claim:

1. A body of catalyzable, polymerizable material having in the interior thereof: a body of activator material separated from said first body of polymerizable material by a rupturable membrane; and a porous tape carrier for said material folded in accordion pleats.

2. A body of catalyzable, polymerizable material having in the interior thereof: a body of activator material separated from said first body of polymerizable material by a rupturable membrane; and a porous tape carrier for said materials folded in accordion pleats, said pleats being maintained by stitching therethrough.

3. A body of catalyzable, polymerizable material having in the interior thereof: a body of activator material separated from said first body of polymerizable material by a rupturable membrane; and a porous tape carrier for said materials folded in accordion pleats, said pleats being maintained by pressure-sensitive tape therearound.

4. A body of catalyzable, polymerizable material provided with means for introducing activator material thereinto, having in the interior of said body a porous tape carrier for said materials folded in accordion pleats.

5. The device of claim 4 wherein said pleats are maintained by stitching therethrough.

6. The device of claim 4 wherein said pleats are maintained by pressure-sensitive tape therearound.

(References on following page)

References Cited in the file of this patent

UNITED STATES PATENTS

| | | |
|---|---|---|
| 1,945,885 | Darlington | Feb. 6, 1934 |
| 2,161,725 | Smith | June 6, 1939 |
| 2,374,128 | Pinckert | Apr. 17, 1945 |
| 2,402,981 | Beal | July 2, 1946 |
| 2,489,490 | Heilbronner | Nov. 29, 1949 |
| 2,565,887 | Salfisberg | Aug. 28, 1951 |
| 2,542,048 | Nagel | Feb. 20, 1951 |
| 2,654,684 | Heikin | Oct. 6, 1953 |
| 2,669,965 | Coughlan | Feb. 23, 1954 |

FOREIGN PATENTS

| | | |
|---|---|---|
| 372,570 | Great Britain | May 12, 1932 |
| 935,937 | France | Feb. 9, 1948 |